US010921543B2

(12) United States Patent
Uemura (10) Patent No.: US 10,921,543 B2
(45) Date of Patent: Feb. 16, 2021

(54) LENS BARREL AND OPTICAL APPARATUS

(71) Applicant: CANON KABUSHIKI KAISHA, Tokyo (JP)

(72) Inventor: Kohei Uemura, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 206 days.

(21) Appl. No.: 16/260,181

(22) Filed: Jan. 29, 2019

(65) Prior Publication Data

US 2019/0235195 A1 Aug. 1, 2019

(30) Foreign Application Priority Data

Jan. 30, 2018 (JP) .................................. 2018-013810

(51) Int. Cl.
*G02B 7/02* (2021.01)
*G02B 9/62* (2006.01)

(52) U.S. Cl.
CPC ............. *G02B 7/021* (2013.01); *G02B 7/023* (2013.01); *G02B 9/62* (2013.01)

(58) Field of Classification Search
CPC .......... G02B 7/02; G02B 7/021; G02B 7/025; G02B 7/022; G02B 7/026
USPC ....................................................... 359/819
See application file for complete search history.

(56) References Cited

U.S. PATENT DOCUMENTS

| 8,218,255 B2 | 7/2012 | Katano | |
|---|---|---|---|
| 2006/0274435 A1* | 12/2006 | Nomura | G02B 7/022 359/819 |
| 2012/0019933 A1* | 1/2012 | Nakamura | G02B 7/102 359/700 |
| 2015/0205068 A1* | 7/2015 | Sasaki | G02B 7/102 359/700 |

FOREIGN PATENT DOCUMENTS

| JP | 2011033667 A | 2/2011 |
|---|---|---|
| JP | 2016212329 A | 12/2016 |

* cited by examiner

*Primary Examiner* — Mohammed A Hasan
(74) *Attorney, Agent, or Firm* — Rossi, Kimms & McDowell LLP (57) ABSTRACT

A lens barrel that is difficult to be broken by external forces without upsizing the lens barrel or degrading optical performance. The lens barrel has a lens holding member, an exterior frame disposed on a subject side of the lens holding member, a guide member disposed on an outer peripheral side of the lens holding member to guide the lens holding member movably in the optical axis direction, and a cam ring held rotatably on an outer peripheral side of the guide member. The lens holding member and the exterior frame are engaged with respective different cam grooves disposed in the cam ring and are driven by the cam ring in a state of being urged by an elastic member in such directions as that the lens holding member and the exterior frame are separated from each other in the optical axis direction.

10 Claims, 6 Drawing Sheets

LENS BARREL AND OPTICAL APPARATUS

BACKGROUND OF THE INVENTION

Field of the Invention

The present invention relates to a lens barrel, and an optical apparatus equipped with the lens barrel, and in particular to a structure that movably supports a lens group.

Description of the Related Art

There has been proposed a technique relating to a structure that holds a lens group movably in a rectilinear manner in the optical axis direction, in a lens barrel for interchangeable lenses which is used in a state of being mounted on a camera or the like, and a lens barrel of a camera with built-in lenses.

Japanese Laid-Open Patent Publication (Kokai) No. 2016-212329 discloses a technique to, at the time of focusing, extend a movable lens group engaged with a plurality of cam grooves on a cam cylinder held on a guide cylinder. Japanese Laid-Open Patent Publication (Kokai) No. 2011-33667 discloses a technique for a rectilinear cylinder to hold a cam cylinder having a plurality of cam grooves through bayonet engagement.

According to Japanese Laid-Open Patent Publication (Kokai) No. 2016-212329, however, a large external force is exerted directly on the movable lens group engaged with the plurality of cam grooves on the cam cylinder, and hence the cam grooves on the cam cylinder and cam followers may be broken or deformed.

Moreover, if the number of cam grooves is simply increased, nail portions for holding the cam cylinder on the rectilinear cylinder through bayonet engagement would cross the cam grooves during actuation of a lens as described in Japanese Laid-Open Patent Publication (Kokai) No. 2011-33667. In this case, smooth actuation of the lens may be degraded, and in order to avoid this, the cam cylinder needs to be increased in diameter.

SUMMARY OF THE INVENTION

The present invention provides a lens barrel that is difficult to be broken by external forces without upsizing the lens barrel or degrading optical performance, and an optical apparatus equipped with the lens barrel.

Accordingly, the present invention provides a lens barrel that has a lens holding member holding a plurality of lens, comprising: an exterior frame disposed on a subject side of the lens holding member; a guide member disposed on an outer peripheral side of the lens holding member and configured to guide the lens holding member movably in an optical axis direction; and a cam ring held rotatably on an outer peripheral side of the guide member, wherein the lens holding member and the exterior frame are engaged with respective different cam grooves disposed in the cam ring and are driven by the cam ring in a state of being urged by an elastic member in such directions as that the lens holding member and the exterior frame are separated from each other in the optical axis direction.

Accordingly, the present invention provides a lens barrel that has at least one lens holding member holding a lens, comprising: a movable lens group including the lens holding member; an exterior frame disposed on a subject side of the movable lens group; a guide member disposed on an outer peripheral side of the movable lens group and configured to guide the movable lens group movably in an optical axis direction; and a cam ring provided with a peripheral groove that is engaged with a projection disposed on an outer periphery of the guide member, and also provided with a plurality of different cam grooves with which the movable lens group and the exterior frame are engaged, the cam ring being rotatably held on an outer peripheral side of the guide member, wherein the cam ring has a cam groove-introducing portion that extends to an end of the cam ring substantially in parallel to the optical axis direction, and connects the plurality of different cam grooves with each other, while crossing the peripheral groove, and the projection does not cross the cam groove-introducing portion when the cam ring rotates with respect to the guide member with movement of the movable lens group.

According to the present invention, it is possible to provide a lens barrel that is difficult to be broken by external forces without upsizing the lens barrel or degrading optical performance, and an optical apparatus equipped with the lens barrel.

Further features of the present invention will become apparent from the following description of exemplary embodiments with reference to the attached drawings.

DESCRIPTION OF THE EMBODIMENTS

The present invention will now be described in detail below with reference to the accompanying drawings showing an embodiment thereof.

Figure 1:
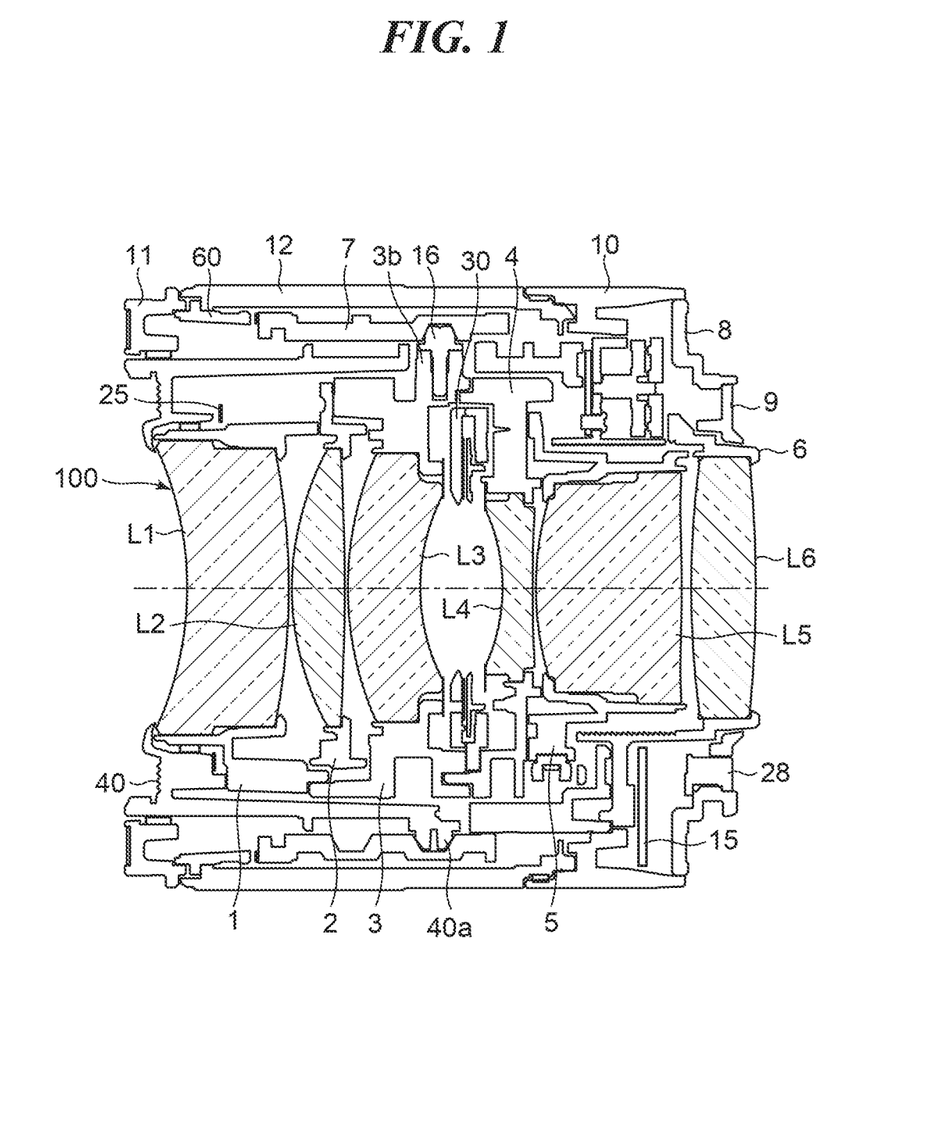
FIG. 1 is a cross-sectional view showing a lens barrel at an infinite photographing position according to an embodiment of the present invention.
Figure 2:
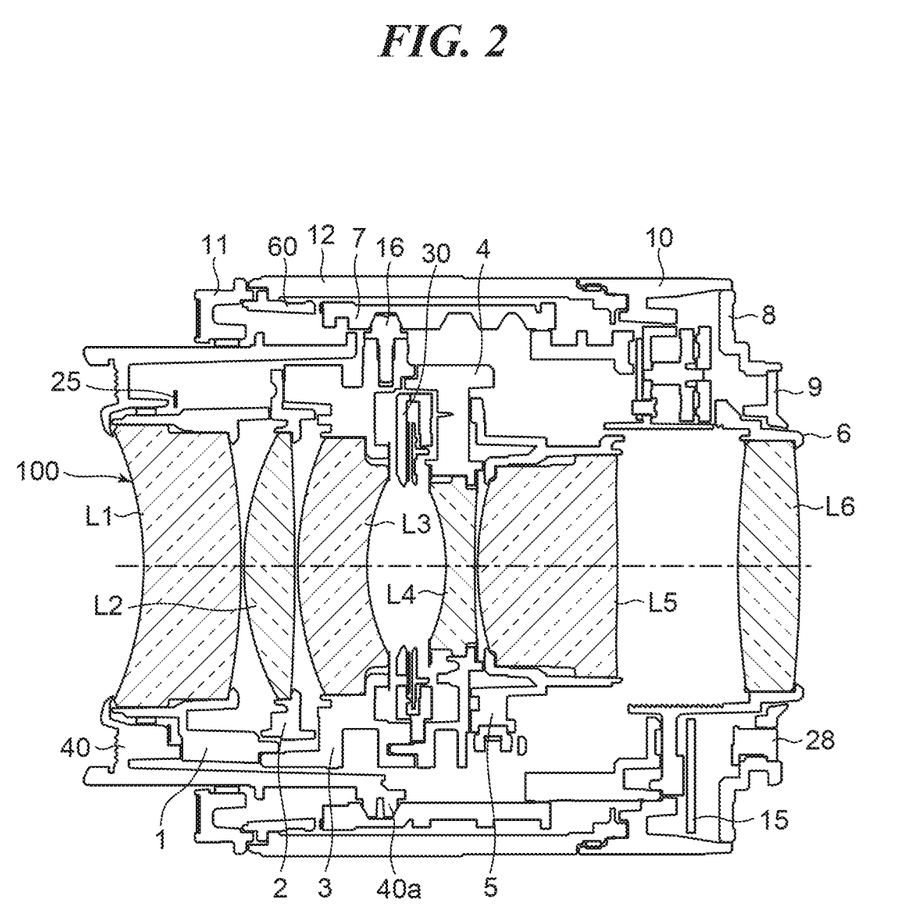
FIG. 2 is a cross-sectional view showing the lens barrel of FIG. 1 at a close-up photographing position.
Figure 3:
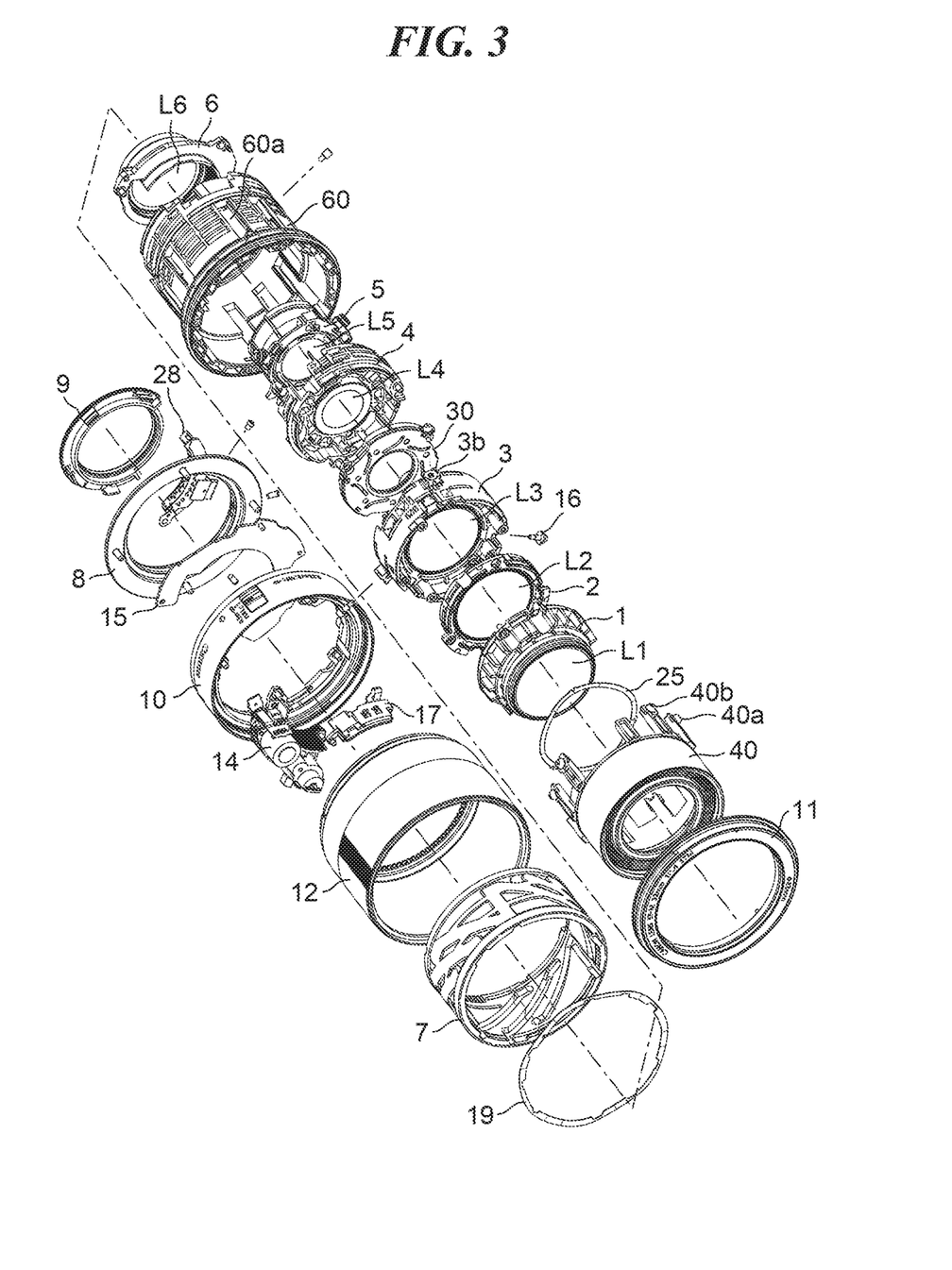
FIG. 3 is an exploded perspective view of the lens barrel of FIG. 1 viewed from a subject side.

FIG. 1 is a cross-sectional view showing a lens barrel at an infinite photographing position according to an embodiment of the present invention, FIG. 2 is a cross-sectional view showing the lens barrel of FIG. 1 at a close-up photographing position, and FIG. 3 is an exploded perspective view of the lens barrel of FIG. 1 viewed from a subject side. It should be noted that a camera system is implemented by detachably mounting the lens barrel of the present embodiment onto a camera main body (not shown), which is an example of an apparatus main body of an optical apparatus.

As shown in FIGS. 1 to 3, the lens barrel according to the present embodiment has a lens mount 8 (hereafter referred to as "the mount 8") for mounting the lens barrel onto the camera main body (not shown). The mount 8 is secured to a guide cylinder 60 (guide member) by screws or the like (not shown). A rear cover 9 is fixed to the mount 8 by elastic force of nail portions with the rear cover 9 integrally formed thereon. An exterior ring 10 is also fixed to the guide cylinder 60 by screws or the like (not shown). A cosmetic ring 11 to which a hood (not shown) for shielding harmful light can be attached is fixed to a front end of the exterior ring 10. On an outer peripheral side of the guide cylinder 60, a cam ring 7 is rotatably disposed at a predetermined position in the optical axis direction.

Figure 4:
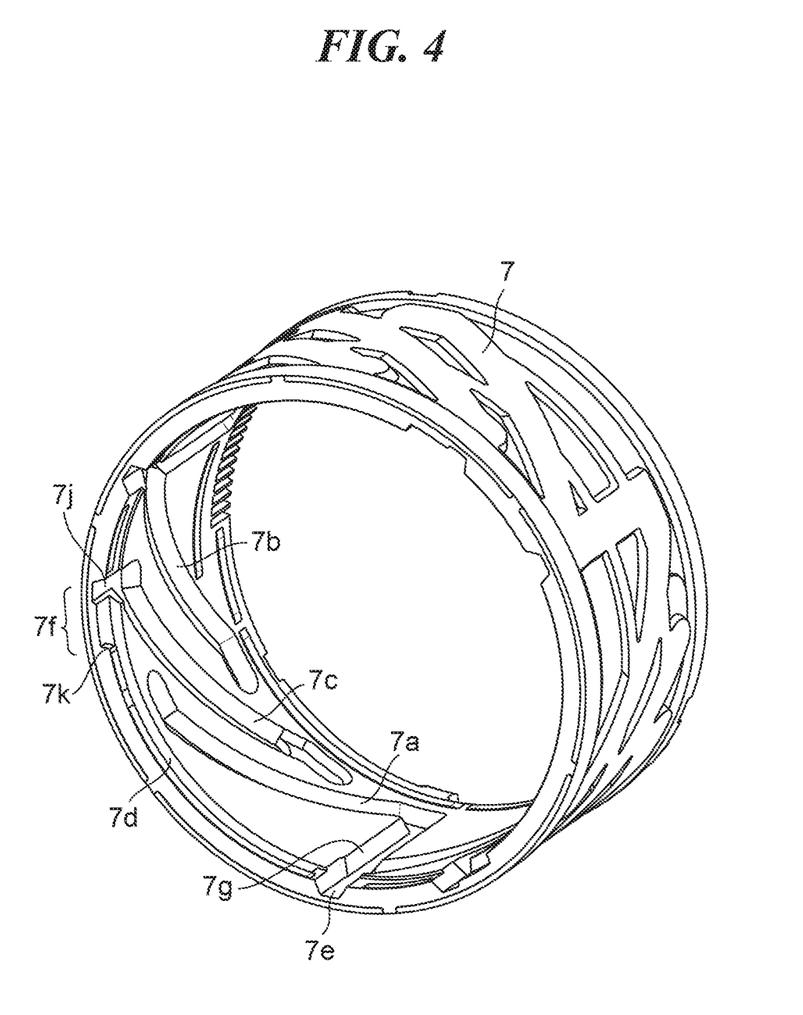
FIG. 4 is a perspective view of a cam ring viewed from the subject side.
Figure 5:
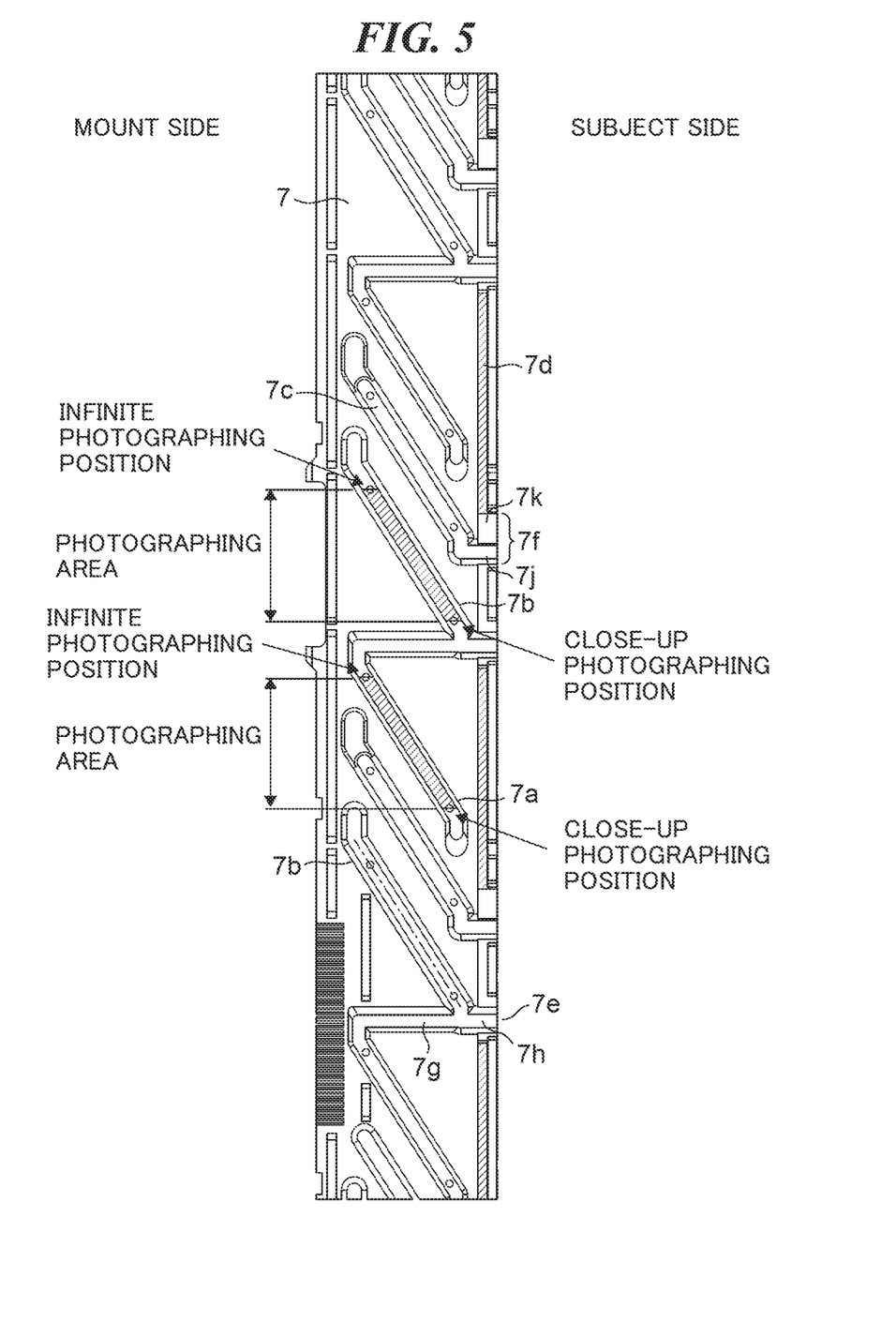
FIG. 5 is a developed view of the cam ring on its inner peripheral side.
Figure 6:
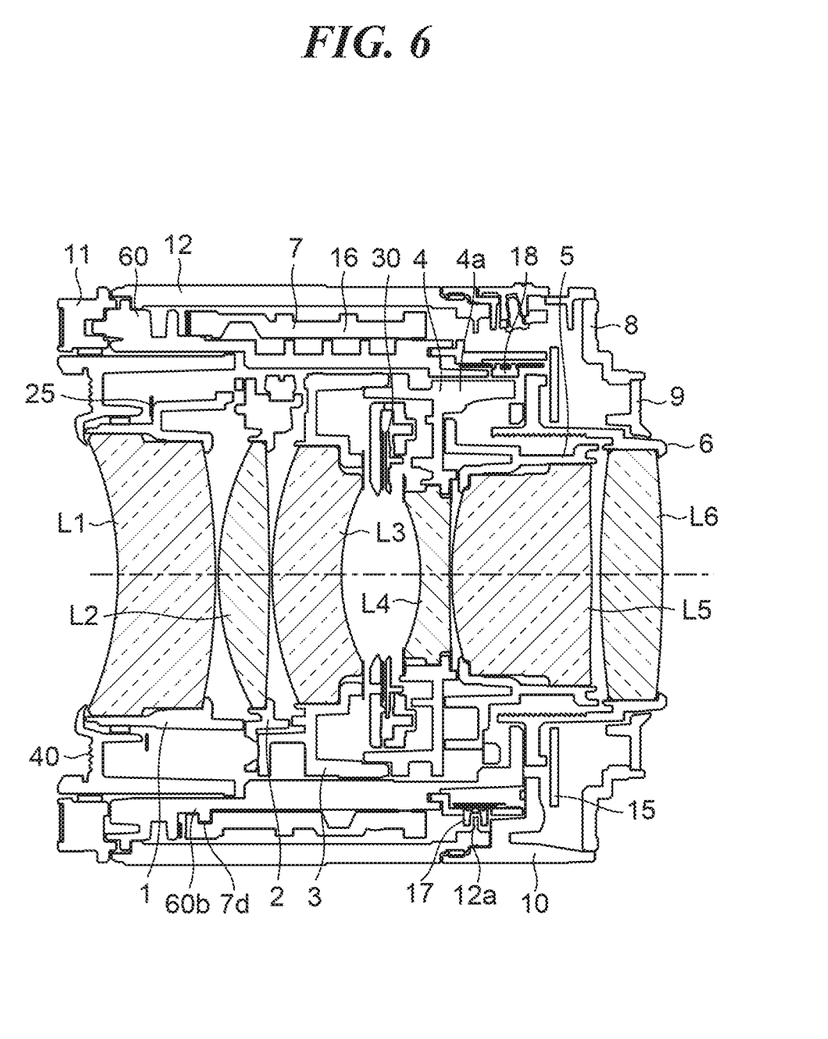
FIG. 6 is a cross-sectional view showing a state in which the cam ring and a guide cylinder of the lens barrel are engaged with each other.

FIG. 4 is a perspective view of the cam ring 7 viewed from the subject side, FIG. 5 is a developed view of the cam ring 7 on its inner peripheral side, and FIG. 6 is a cross-sectional view showing a state in which the cam ring 7 and the guide cylinder 60 of the lens barrel are engaged with each other. As shown in FIGS. 4 and 5, on an inner peripheral surface of the cam ring 7, three first cam grooves 7a, three second cam grooves 7b, and three third cam grooves 7c which are different in a groove width from the second cam grooves 7b are formed at substantially regular intervals in the circumferential direction, and each of the cam grooves has a tapered surface.

On a front side, i.e., the subject side of the inner peripheral surface of the cam ring 7, three peripheral grooves 7d are formed at the same position with respect to the optical axis direction and at substantially regular intervals in the circumferential direction. The three peripheral grooves 7d are engaged with respective three projections 60b disposed on an outer periphery of the guide cylinder 60. This rotatably holds the cam ring 7 with respect to the guide cylinder 60 while being inhibited from moving in the optical axis direction.

As shown in FIGS. 1 to 3, a first lens-holding frame 1 holds a first lens group L1, a second lens-holding frame 2 holds a second lens group L2, a third lens-holding frame 3 holds a third lens group L3, a fourth lens-holding frame 4 holds a fourth lens group L4, a fifth lens-holding frame 5 holds a fifth lens group L5, and a sixth lens-holding frame 6 holds a sixth lens group L6. A diaphragm device 30 has a motor (not shown), which is a driving source, and is fixed by being sandwiched between the third lens-holding frame 3 and the fourth lens-holding frame 4. Controlling an operation of the motor causes the diaphragm device 30 to change the aperture area of a built-in aperture blade to thereby adjust the amount of light. Each of the lens-holding frames 1 to 6 corresponds to an example of a lens holding member of the present invention.

The first lens-holding frame 1 is fixed to the third lens holding frame 3 at three positions by screws or the like. The second lens-holding frame 2 is held movably in a direction perpendicular to the optical axis while being inhibited from moving in the optical axis direction by being sandwiched between the first lens-holding frame 1 and the third lens-holding frame 3. The fourth lens holding frame 4 is fixed to the third lens-holding frame 3 at three positions by screws or the like.

The fifth lens-holding frame 5 is inhibited from moving in the optical axis direction by the fourth lens-holding frame 4 and held movably in a direction perpendicular to the optical axis. The sixth lens-holding frame 6 is fixed to the guide cylinder 60 by screws or the like (not shown). The first lens group L1, the second lens group L2, the third lens group L3, the fourth lens group L4, the fifth lens group L5, the sixth lens group L6, and the diaphragm device 30 constitute a photographic optical system.

A filter frame 40 (exterior frame) to which a filter (not shown) can be attached is disposed on a front side, i.e., on the subject side of the first lens group L1. The components except for the sixth lens group L6, that is, the first to fifth lens groups L1 to L5 and the diaphragm device 30 are main elements of a movable lens group 100 movable integrally in the optical axis direction.

Three first cam followers 16 are screwed into and joined to an outer peripheral portion of the third lens-holding frame 3 at three positions in the circumferential direction. The three first cam followers 16, each of which has a truncated cone-shaped portion, are engaged with the three first cam grooves 7a (FIGS. 4 and 5) formed in the cam ring 7, respectively. In an outer peripheral portion of the filter frame 40, three second cam followers 40a are formed at three positions in the circumferential direction which are different in phase from the first cam followers 16. In the outer peripheral portion of the filter frame 40, three cam followers 40b (FIG. 3) are also integrally formed at three positions in the circumferential direction which are different in phase from the first cam followers 16 and the second cam followers 40a.

The second cam followers 40a are engaged with the second cam grooves 7b, respectively, and the third cam follower 40b are engaged with the third cam grooves 7c, respectively. Under normal conditions, the third cam followers 40b are not abutted against cam surfaces of the three third cam grooves 7c, respectively. The first cam grooves 7a, the second cam grooves 7b, and the third cam grooves 7c have the same amount of cam lift.

For this reason, although the movable lens group 100 and the filter frame 40 are not configured as an integral unit, they always move similarly with the same amount of cam lift on a front side, i.e., the subject side of the movable lens group 100. Upon impact from outside, the force is transmitted first to areas where the second cam followers 40a, which are disposed in the filter frame 40 on the front side, i.e., the subject side of the movable lens group 100, and the second cam grooves 7b are engaged with each other.

Then, the force is transmitted to areas where the second cam followers 40a and the third cam grooves 7c are engaged with each other to prevent the second cam followers 40a and the third cam followers 40b from falling off the second cam grooves 7b and the third cam grooves 7c, which are engaged therewith, respectively. The filter frame 40 and the movable lens group 100 are separately engaged with the cam ring 7, and hence the force is not transmitted to areas where the first cam followers 16 and the first cam grooves 7a are engaged with each other. This provides neither deformation nor breakage, thereby preventing degradation of optical performance even if there is an impact from outside. Moreover, photographing areas of the first cam groove 7a and photographing areas of the second cam grooves 7b are disposed in a manner not overlapping in the optical axis direction so as to prevent the force from being transmitted to the first cam grooves 7a.

The filter frame 40 and the movable lens group 100 are urged by an urging spring 25 (elastic member) in such directions as that they are separated from each other in the optical axis direction. The urging spring 25 is shaped like an annular plate enclosing the first lens group L1 disposed closest to the subject and is held by the first lens-holding frame 1 at a location closer to the mount 8 (on a side opposite to the subject side) with respect to a vertex of the first lens group L1 on the subject side. The urging spring 25 urges the first cam followers 16 toward the tapered surfaces of the first cam grooves 7a on the mount 8 side and urges the second cam followers 40a toward the tapered surfaces of the second cam grooves 7b on the subject side.

As a result, even when the camera changes its attitude during shooting, a shot can be taken without degrading optical performance. Moreover, when a shock is given to the filter frame 40 from the subject side, the shock can be alleviated by the urging spring 25. It should be noted that as is the case with the first cam followers 16, the second cam followers 40a and the third cam followers 40b may be configured as components separated from the filter frame 40. The mount 8 side and the subject side of the cam grooves 7a to 7c correspond to the infinite photographing position and the close-up photographing position, respectively (see FIGS. 4 and 5).

On the one hand, from an end of the first cam groove 7a on the infinite photographing position side, a first cam groove-introducing portion 7g is extended forward substantially in parallel to the optical axis and opened to a front side, i.e., the subject side of the cam ring 7. The first cam groove-introducing portions 7g are insertion grooves for engaging the movable lens group 100 including the first cam followers 16 with the first cam grooves 7a. On the other hand, from an end of each second cam groove 7b on the close-up photographing position side, a second cam groove-introducing portion 7h is extended forward in the optical axis direction and opened to a front side, i.e., the subject side of the cam ring 7. The first cam groove 7a and the second cam groove 7b are connected to each other by the first and second cam groove-introducing parts 7g and 7h.

From an end of the third cam groove 7c on the infinite photographing position side, a third cam groove-introducing portion 7j is extended forward in the optical axis direction and opened to a front side, i.e., the subject side of the cam ring 7. The second cam groove-introducing portions 7h and the third cam groove-introducing portions 7j are insertion grooves for engaging the filter frame 40 including the second cam followers 40a and the third cam followers 40b with the second cam grooves 7b and the third cam grooves 7c.

Each of the peripheral groove 7d has a peripheral groove-introducing portion 7k which is extended forward in the optical axis direction and opened to a front side, i.e., the subject side of the cam ring 7. The first cam groove-introducing portions 7g and the second cam groove-introducing portions 7h join together at front ends of the cam ring 7 on the subject side (joining portions 7e). The third cam groove-introducing portions 7j and the peripheral groove-introducing portions 7k join together at front ends of the cam ring 7 on the subject side (joining portions 7f). This decreases the number of introducing grooves, and enables the peripheral grooves 7d to be disposed without crossing the joining portions 7e or the joining portions 7f.

Therefore, it is possible to eliminate the need for increasing the diameter of the cam ring 7 for the purpose of preventing the peripheral grooves 7d from crossing the joining portions 7e. Moreover, since the projections 60b cross no cam groove-introducing portion when the cam ring 7 rotates on the outer peripheral side of the guide cylinder 60, the projections 60b would not get snagged or vibrate, and therefore, the cam ring 7 can smoothly move without degrading optical performance.

Key portions 3b (see FIGS. 1 and 3) are formed on both sides of a part of the third lens-holding frame 3, which holds each first cam follower 16, in the circumferential direction. The key portions 3b are engaged with three rectilinear grooves 60a formed in the guide cylinder 60 to guide rectilinear movement of the third lens-holding frame 3 in the optical axis direction.

When the cam ring 7 rotates about the optical axis, the first cam followers 16 are caused to move in the optical axis direction by cam lift of the first cam grooves 7a, and hence the third lens-holding frame 3 is guided by the rectilinear groove portions 60a to rectilinearly move in the optical axis direction. Namely, the movable lens group 100 moves in the optical axis direction. A focusing operation is performed between an infinite end and a close-up end by moving the movable lens group 100 in the optical axis direction according to a camera-to-subject distance.

A wave washer 19 (see FIG. 3) urges the cam ring 7 in the optical axis direction against the guide cylinder 60 to prevent the cam ring 7 from rattling in the optical axis direction. A focusing ring 12 has an inner peripheral portion fitted on an outer peripheral portion of the guide cylinder 60 and in the exterior ring 10, and rotatably held at a fixed position. A motor unit 14 has a motor and a gear box, and is fixed to the guide cylinder 60 by screws or the like (not shown). An output gear of the motor unit 14 is meshed with an inner gear (not shown) disposed on an inner peripheral side of the cam ring 7. Rotation of the motor allows the cam ring 7 to be rotated to move the movable lens group 100 in the optical axis direction.

As shown in FIG. 6, a photo interrupter 18 is fixed to the guide cylinder 60 via a holding member. The movable lens group 100 has a rib portion 4a disposed in the second lens-holding frame 4. A rectangular wave signal is output in response to the rib portion 4a passing between a light-emitting unit and a light-receiving unit of the photo interrupter 18, thereby making it possible to detect a position of the movable lens group 100.

Two photo interrupters 17 are also fixed to the guide cylinder 60 via holding members. The focusing ring 12 has a plurality of projections 12a shaped like comb teeth, and a rectangular wave signal is output by rotation of the focusing ring 12 causing the plurality of projections 12a shaped like comb teeth to pass between light-emitting units and light-receiving units of the photo interrupters 17. By counting this rectangular wave signal or monitoring its output intervals, a rotational direction and a rotational amount or a rotational speed of the focusing ring 12 are detected. Operation of the motor unit 14 is controlled according to the rotational direction and the rotational amount or the rotational speed of the focusing ring 12.

Electronic components are mounted on a circuit board 15, which is fixed to the exterior ring 10 via screws or the like (not shown). The diaphragm device 30, the motor unit 14, an encoder flexible circuit board (not shown), an AF/MF changeover switch (not shown), and the photo interrupters 17 are electrically connected to the circuit board 15 via flexible printed circuit boards. A microcomputer mounted on the circuit board 15 controls various operations of the diaphragm device 30, the motor unit 14, and so forth. Moreover, a contact block 28 fastened to the mount 8 by screws is connected to the circuit board 15 via a flexible printed circuit board so as to communicate with the camera main body and receive power.

As described above, according to the present embodiment, it is possible to provide a lens barrel that is difficult to be broken by external forces without upsizing the lens barrel or degrading optical performance, and a camera equipped with the lens barrel.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-013810, filed Jan. 30, 2018 which is hereby incorporated by reference herein in its entirety.

What is claimed is:

1. A lens barrel that has a lens holding member holding a plurality of lens, comprising:
   an exterior frame disposed on a subject side of the lens holding member;
   a guide member disposed on an outer peripheral side of the lens holding member and configured to guide the lens holding member movably in an optical axis direction; and
   a cam ring held rotatably on an outer peripheral side of the guide member,
   wherein the lens holding member and the exterior frame are engaged with respective different cam grooves disposed in the cam ring and are driven by the cam ring in a state of being urged by an elastic member in such directions as that the lens holding member and the exterior frame are separated from each other in the optical axis direction.

2. The lens barrel according to claim 1, wherein the elastic member is disposed so as to enclose an outer periphery of a lens in the movable lens group disposed closest to a subject.

3. The lens barrel according to claim 2, the elastic member is disposed on a side opposite to the subject side of the lens in the optical axis direction with respect to a vertex of the lens on the subject side.

4. The lens barrel according to claim 1, wherein the elastic member is shaped like a plate.

5. A lens barrel that has a lens holding member holding a plurality of lens, comprising:
   an exterior frame disposed on a subject side of the lens holding member;
   a guide member disposed on an outer peripheral side of the lens holding member and configured to guide the lens holding member movably in an optical axis direction; and
   a cam ring provided with a peripheral groove that is engaged with a projection disposed on an outer periphery of the guide member, and also provided with a plurality of different cam grooves with which the lens holding member and the exterior frame are engaged, the cam ring being rotatably held on an outer peripheral side of the guide member,
   wherein the cam ring has a cam groove-introducing portion that extends to an end of the cam ring substantially in parallel to the optical axis direction, and connects the plurality of different cam grooves with each other, while crossing the peripheral groove, and the projection does not cross the cam groove-introducing portion when the cam ring rotates with respect to the guide member with movement of the lens holding member.

6. The lens barrel according to claim 5, wherein in the cam groove-introducing portion, one of two cam grooves of the plurality of different cam grooves extends from an end of the lens holding member on the subject side, and the other of the two cam grooves extends from an end of the lens holding member on the side opposite to the subject side to an end of the cam ring and is joined to the one of the two cam grooves.

7. The lens barrel according to claim 6, wherein the one of the two cam grooves and the other of the two cam groove are disposed in a manner not overlapping in the optical axis direction in a photographing area.

8. The lens barrel according to claim 5, wherein an area where the projection does not cross the cam groove-introducing portion is the photographing area.

9. The lens barrel according to claim 1, wherein grooved surfaces of the cam grooves are tapered.

10. An optical apparatus equipped with a lens barrel, the optical apparatus comprising the lens barrel according to claim 1.

* * * * *